May 27, 1924.
J. KOSARIK
AUXILIARY BRAKE FOR AUTOMOBILES
Filed Dec. 6, 1923
1,495,697
2 Sheets-Sheet 2
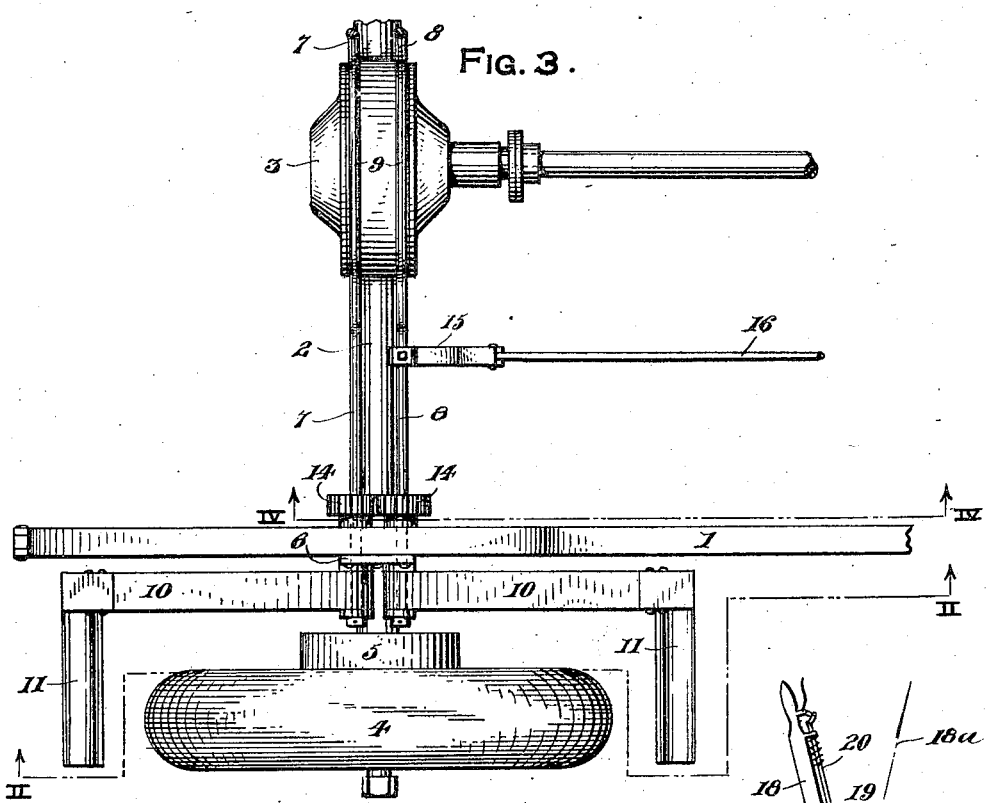
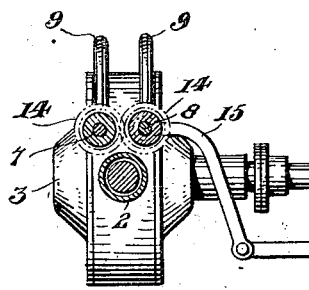
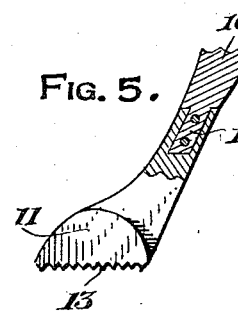
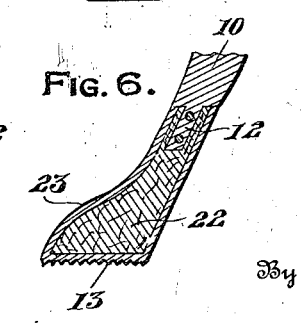
Inventor
J. Kosarik
By F. K. Bryant
Attorney Patented May 27, 1924.

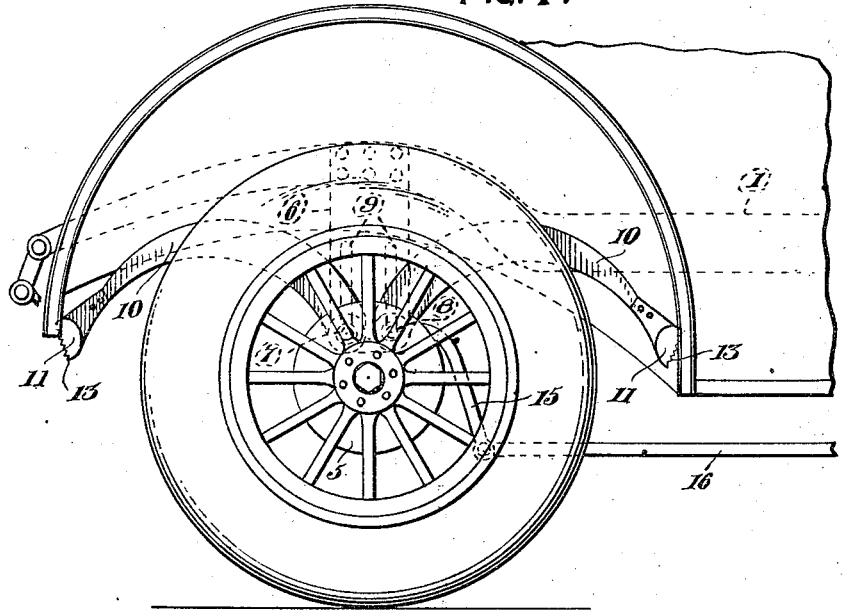
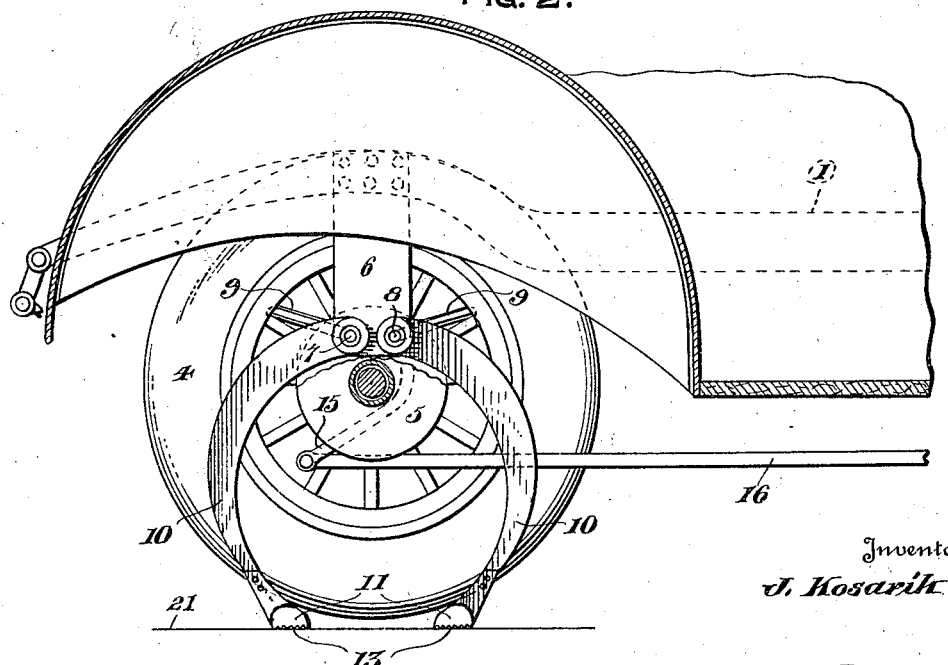

1,495,697

UNITED STATES PATENT OFFICE.

JOHN KOSARIK, OF AVELLA, PENNSYLVANIA.

AUXILIARY BRAKE FOR AUTOMOBILES.

Application filed December 6, 1923. Serial No. 678,879.

*To all whom it may concern:*

Be it known that I, JOHN KOSARIK, a citizen of Czechoslovakia, residing at Avella, in the county of Washington and State of Pennsylvania, have invented certain new and useful Improvements in Auxiliary Brakes for Automobiles, of which the following is a specification.

This invention relates to certain new and useful improvements in auxiliary brakes for automobiles and has particular reference to that type of brake adapted for engagement with the ground and operating to elevate the rear drive wheel from engagement with the ground.

The primary object of the invention is to provide an auxiliary brake for automobiles wherein a pair of cooperating brake arms having ground engaging feet is associated with each rear drive wheel for insuring the braking of the automobile and especially adapted for use when the automobile is at rest.

With the above and other objects in view as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a fragmentary side elevational view of the rear end of an autmobile showing the improved auxiliary brakes in their elevated inoperative position, Figure 2 is a longitudinal sectional view taken on line II—II of Fig. 3 showing the auxiliary brakes lowered to their ground engaging operative positions, Figure 3 is a fragmentary top plan view showing the auxiliary brakes elevated and the devices for operating the same, Figure 4 is a longitudinal sectional view taken on line IV—IV of Fig. 3, Figure 5 is a fragmentary detail view, partly in section of one of the brake arms, Figure 6 is a detail sectional view of a modified form of brake arm, showing a wooden core having a metallic sheet covering, and Figure 7 is a fragmentary elevational view of another form of auxiliary brake arm.

Referring more in detail to the accompanying drawings, a portion of an automobile frame is illustrated, such as a side frame bar 1, the rear axle housing 2, differential case 3 and rear supporting wheels 4 having the usual brake drums 5 associated with the opposite ends of the axle in the housing 2.

As shown more clearly in Fig. 2, a hanger plate 6 depends from the side frame bar 1 and journalled transversely of the automobile frame in the lower end of the oppositely positioned hanger plates 6 is a pair of rods 7 and 8. The journalled rods 7 and 8 are bent intermediate their ends as at 9 to clear the differential housing 3. Cooperating oppositely curved brake arms 10 are fixed to the ends of the shafts 7 and 8 outwardly of the frame bars 1, each arm carrying a right angularly directed brake shoe 11 traversing the wheel 4 as shown in Fig. 3, the brake shoes 11 being connected to the arms 10, preferably by the type of joint 12 shown in Fig. 5. To facilitate proper gripping of the road by the brake shoes 11, the lower faces thereof are serrated as at 13.

The rods 7 and 8 are caused to rotate in unison by the gears 14 secured to said rods and meshing with each other, the operating mechanism being connected to the forwardly positioned shaft 8 and including an arm 15 having a relatively long link rod connection 16 with the brake lever 17, the upper handle end 18 of which moves over the segment 19 to be retained in adjusted positions by the tensioned latch rod 20.

With the auxiliary brake arms 10 in their elevated inoperative positions shown in Fig. 1, the handle end 18 of the brake lever is rearwardly positioned as shown by full lines in Fig. 4, and when the handle lever 18 is forwardly shifted to the dot and dash line position 18ª, the two shafts 7 and 8 are caused to be rotated by their gear connections 14 with a consequent lowering of the arms 10 and the brake shoes 11 into engagement with the ground 21 as shown in Fig. 2, the brake shoes 11 being positioned beneath the wheel 4 and causing a slight elevation thereof to insure proper braking of the automobile. Reverse movement of the lever 17 will release the auxiliary brake arm and the wheels 4 will be lowered upon the ground.

If desired, the type of brake shoe illustrated in Fig. 6 may be employed wherein the shoe is formed of wood 22 and has a sheet metal covering 23, Fig. 7 showing a further modification of the brake shoe wherein the shoe 11ª is in direct alinement with the brake arm 10 and engages the ground laterally of the wheel 4.

While there are herein shown and described the preferred embodiments of the present invention, it is nevertheless to be understood that minor changes may be made therein without departing from the spirit and scope of the invention as claimed.

What is claimed as new is:—

1. In an auxiliary brake for automobiles, a pair of gear connected shafts journaled across the automobile frame adjacent the rear axle housing, brake shoes carried by the ends of the shafts and manually operable means connected to one of the shafts.

2. In an auxiliary brake for automobiles, a pair of gear connected shafts journaled across the automobile frame adjacent the rear axle housing, said shafts having arched portions clearing the differential housing, brake shoes carried by the ends of the shafts and manually operable means connected to one of the shafts.

3. In an auxiliary brake for automobiles, a pair of gear connected shafts journaled across the automobile frame adjacent the rear axle housing, said shafts having arched portions clearing the differential housing, pairs of oppositely curved arcuate arms secured to the ends of the shafts, brake shoes carried by the outer ends of the arms and manually operable means connected to one of the shafts.

4. In an auxiliary brake for automobiles, a pair of gear connected shafts journaled across the automobile frame adjacent the rear axle housing, said shafts having arched portions clearing the differential housing, pairs of oppositely curved arcuate arms secured to the ends of the shafts, brake shoes carried by the outer ends of the arms and manually operable means connected to one of the shafts, said brake shoes extending at right angles to the arms and traversing the path of the wheels.

5. In an auxiliary brake for automobiles, a pair of gear connected shafts journaled across the automobile frame adjacent the rear axle housing, said shafts having arched portions clearing the differential housing, pairs of oppositely curved arcuate arms secured to the ends of the shafts, brake shoes carried by the outer ends of the arms, manually operable means connected to one of the shafts, said brake shoes extending at right angles to the arms and traversing the path of the wheels, and hanger plates for the shafts secured to the side bars of the automobile frame.

In testimony whereof I affix my signature.

JOHN KOSARIK.